United States Patent [19]
Levran et al.

[11] Patent Number: 5,414,609
[45] Date of Patent: May 9, 1995

[54] DC TO DC/DC TO AC POWER CONVERSION SYSTEM

[75] Inventors: Alexander Levran, Los Angeles; Joseph M. Nowosielski, Laguna Hills; Giao M. Ton-That, Mission Viejo; Ramamoorthy Rajagopalan, Irvine, all of Calif.

[73] Assignee: Square D Company, Palatine, Ill.

[21] Appl. No.: 935,041

[22] Filed: Aug. 25, 1992

[51] Int. Cl.⁶ .................................. H02M 3/335
[52] U.S. Cl. .............................. 363/17; 363/25; 363/98; 363/132
[58] Field of Search .................. 363/17, 24, 25, 26, 363/98, 132

[56] References Cited

U.S. PATENT DOCUMENTS

| | | |
|---|---|---|
| 3,395,327 | 7/1968 | Kaiser et al. |
| 3,986,097 | 10/1976 | Woods ........................ 363/22 |
| 4,538,073 | 8/1985 | Freige et al. .................. 307/33 |
| 4,590,546 | 5/1986 | Maile ........................... 363/37 |
| 4,719,550 | 1/1988 | Powell et al. ................ 363/37 |
| 4,751,398 | 6/1988 | Ertz, III ....................... 307/66 |
| 4,818,891 | 4/1989 | Drinkwater ................... 307/64 |
| 4,961,130 | 10/1990 | Kirchberg, Jr. ............... 363/41 |
| 4,985,819 | 1/1991 | Mori et al. ................... 363/37 |
| 4,992,751 | 2/1991 | Attwood et al. .............. 330/10 |
| 5,140,509 | 8/1992 | Murugan ...................... 363/17 |
| 5,146,147 | 9/1992 | Wills et al. ................... 318/797 |
| 5,166,579 | 11/1992 | Kawabata et al. ........... 315/209 B |
| 5,208,740 | 5/1993 | Ehsani ......................... 363/124 |
| 5,245,520 | 9/1993 | Imbertson .................... 363/17 |

OTHER PUBLICATIONS

Micro Linear Brochure (Phase Modulation/Soft Switching Controller, pp. 1-12 A Three-Phase Soft-Switched High Power Density DC/DC Converter for High Power Applications) Jul. 11, 1991.
Design Considerations for High-Voltage High-Power Full-Bridge Zero-Voltage-Switched PWM Converer J. A. Sabate et al. 1990 IEEE.

Primary Examiner—Thomas M. Dougherty
Assistant Examiner—Adolf Berhane
Attorney, Agent, or Firm—Michael J. Femal; Richard J. Graefe; Larry I. Golden

[57] ABSTRACT

A pulse width modulation DC to DC converter operates in an open loop mode to convert the DC output of the AC to DC converter to a desired, predetermined DC level using pulse width modulation techniques and a switching configuration substantially similar to that of the AC to DC converter.

22 Claims, 7 Drawing Sheets

DC TO DC/DC TO AC POWER CONVERSION SYSTEM

FIELD OF THE INVENTION

The present invention relates generally to power conversion and distribution systems.

BACKGROUND OF THE INVENTION

Direct current (DC) voltage distribution systems have become more common in the past few years. Automobiles operate on 12 volts, sometimes 6 volts DC. Some large scale power distribution in the former Soviet Union is through transmission of DC voltages. While there are certain inefficiencies associated with distributing DC voltages, one of the more significant difficulties is converting the distribution voltage into a usable application voltage. A distribution or system operating voltage of 12 volts, as in an automobile, may be unusable to power a particular appliance which may require a larger or smaller voltage, or both, to power it. Similarly, a system voltage distribution of several hundred or thousand volts may be practical for the distribution system, but may be inappropriate to power the particular appliances desired.

Attempts to solve power transmission problems and achieve greater efficiency include U.S. Pat. No. 4,751,398 issued to Ertz. Ertz describes a lighting system which converts 2 or 3 phase alternating current input to a direct current output. The direct current output is then distributed to several fluorescent lamp ballasts, which in turn drive fluorescent lamps. In addition, a battery backup system provides a DC power source to the fluorescent lamp ballasts in the event of AC power failure. While the AC power is operating, a battery charger maintains the power level of the battery.

U.S. Pat. No. 4,719,550 issued to Powell discloses a power conversion system dedicated to providing an uninterruptable power supply.

U.S. Pat. No. 4,590,546 issued to Maile discloses a circuit for providing a regulated DC voltage output from a wide range of AC inputs. The circuit relies on a voltage doubler to boost a low AC input level, and a full wave rectifier when the AC voltage is higher.

U.S. Pat. No. 4,538,073 issued to Freige discloses a power distribution system for use in desk top computers. The system provides a DC voltage to a number of remote modules which then regulate the voltage down to the required voltage level. Each of the remote modules are preselected for either 5 volt or 12 volt operation. All of the remote modules are driven by a common 33 kHz signal generator to force all of the remote modules to operate in unison and prevent feedback.

U.S. Pat. No. 4,961,130 issued to Kirchberg describes a pulse width modulation invertor which is intended to accommodate harmonic distortion through the use of "quick" or fast fourier transforms.

SUMMARY OF THE INVENTION

It is therefore an object of the present invention to provide a power conversion system which is extremely efficient in converting direct current to direct current at a different voltage level or to alternating current.

It is a further object of the present invention to provide a power conversion system in which the power conversion portion adjusts the switching time in order to apply a load synchronously with the input voltage waveform.

It is a further object of the present invention to provide a power conversion system which provides an output voltage which is stable and remains substantially unaffected by load switching.

It is a further object of the present invention to provide a power conversion system in which noise generated by a load or load switching does not affect or feed back to the distribution voltage, or the line input voltage.

It is a further object of the present invention to provide a power conversion system in which the voltage output to a load can be substantially higher than the DC input voltage.

It is a further object of the present invention to provide a high efficiency power conversion system in which little energy is lost during the power conversion process.

It is a further object of the present invention to provide a power conversion system which is bidirectional so that power can be converted from the supply side to the load side, or from the load side to the supply side of the converter.

It is a further object of the present invention to provide a power conversion system which is extremely responsive to load switching.

It is a further object of the present invention to provide a power conversion system which operates at extremely high frequencies.

One implementation of the present invention employs a high frequency switching network to generate an alternating current (AC) signal from a direct current (DC) distribution voltage. This AC signal is then passed through a high efficiency transformer and is then converted back into a DC voltage. This high efficiency transfer is accomplished by synchronizing switching elements located on the primary and secondary side of the high efficiency transformer so that the switching elements on the secondary side of the transformer lag the switching elements on the primary side of the high efficiency transformer by a predetermined amount. This results in highly efficient energy coupling from the primary to the secondary side of the transformer. Power transfer can be accomplished from the secondary side to the primary side by having the switching elements on the secondary side of the transformer lead the switching of the switching elements on the primary side of the transformer by a predetermined amount of time. The lead time is generally related to a phase angle in reference to the frequency at which the switching elements are switched.

In an alternative embodiment, activation of switching elements on the primary side of the transformer is controlled by feedback from the DC output signal produced on the secondary side of the transformer. In one such embodiment, a full wave rectifier bridge is employed to convert the high frequency AC signal generated on the primary side of the transformer to a DC signal which is then filtered to create a stable DC output voltage. The feedback network takes into account the voltage present on the load, as well as the AC signal generated by the switching elements on the primary side of the transformer. A series of over voltage protection diodes is employed in one embodiment.

The foregoing and still further features and advantages of the present invention as well as a more complete understanding thereof will be made apparent from

DETAILED DESCRIPTION OF A PREFERRED EMBODIMENT

The present invention converts energy from a DC input into a high frequency AC signal which is passed through a high efficiency transformer and then converted into a desired DC output signal, or AC output signal. Preferably, the AC signal which couples energy through the transformer is extremely high. In one embodiment, a 50 kilohertz (KHz) signal is employed. The signal is limited only by the switching elements located on both the primary and secondary side of the transformer. Switching frequencies of 60 kHz have been achieved and switching frequencies of 100 kHz appear readily possible.

Figure 1:
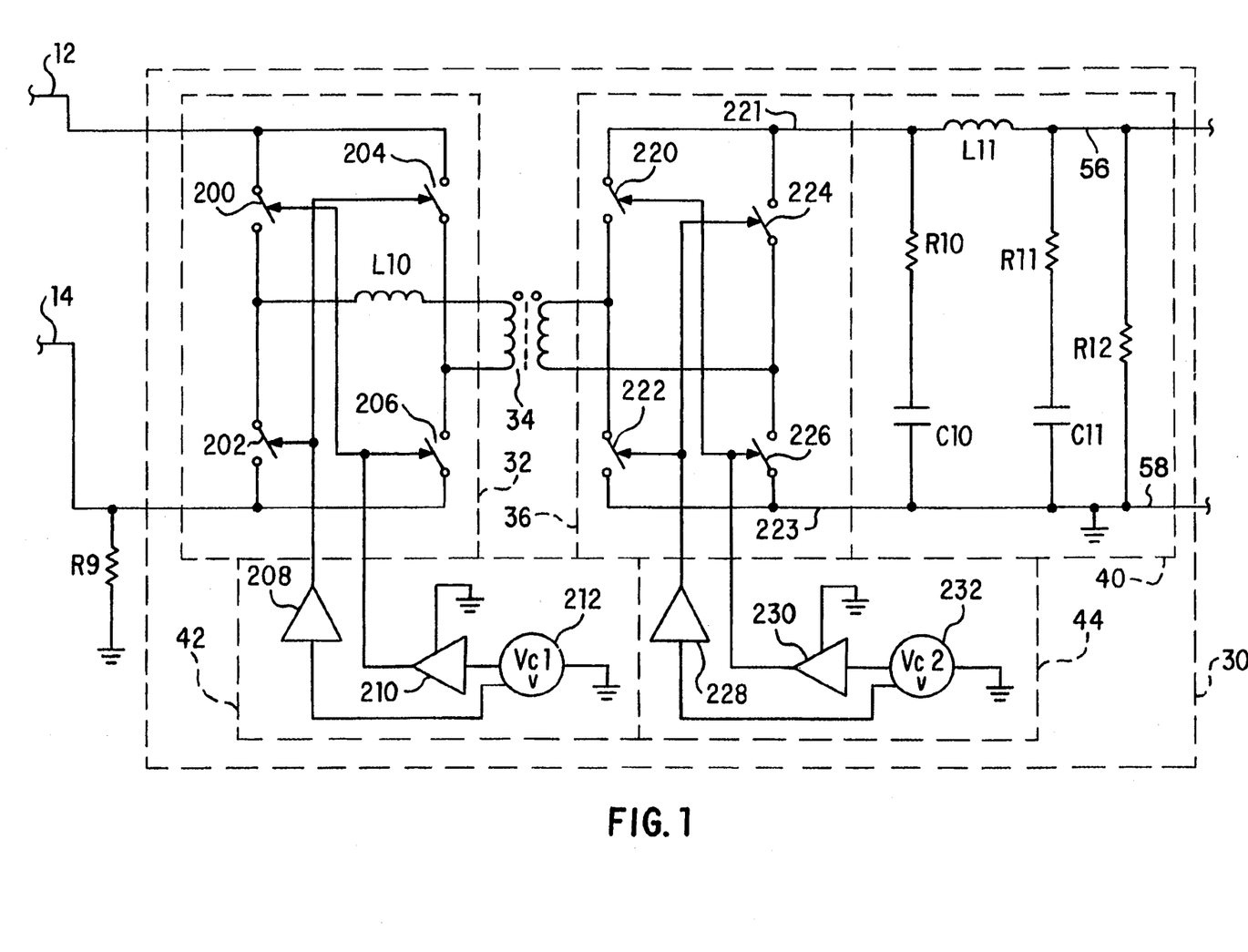
FIG. 1 is a schematic diagram of a bidirectional DC to DC power conversion system without a feedback loop.

Referring to FIG. 1, the heart of the system revolves around transformer 34 and switching elements 200, 202, 204 and 206. Transformer 34 is a high efficiency, high frequency transformer which provides excellent coupling from the primary to the secondary. Operating frequencies of 50 to 100 kHz are preferred for transformer 34. When analyzing transformer 34, there can be seen a leakage inductance which is best characterized by an inductor placed in series with the primary of transformer 34. In addition, there is a magnetizing inductance which is best characterized by placing an inductor in parallel with the primary of transformer 34. Leakage inductance and magnetizing inductance are not particularly critical features of low frequency transformers, such as those that operate at 60 hertz.

Each of the switching elements 200, 202, 204 and; 206 include an active switching element, and a diode and capacitor. As the Switching elements alternate the direction of current flow across transformer 34, the capacitors are alternately charged and discharged. By allowing the capacitors to charge, the energy stored in the transformer, characterized by the magnetizing inductance is stored in the capacitors. If the energy applied to the capacitors is excessive, the diodes conduct, preventing breakdown of the capacitors.

By allowing the capacitors to charge, the energy in the transformer 34 is dissipated. This allows the opposing switching elements to switch on while there is effectively no voltage across the switching elements. This is referred to zero volt switching and significantly reduces the switching losses. The circuit can be tuned to effect switching losses of one watt or less.

In addition to the reduction in switching losses, the configuration of the circuitry of the present invention allows the switching elements to operate at a higher frequency than they may otherwise be able to by closing the switching elements without a voltage applied across them. For example, integrated gate bipolar transistors (IGBT's) typically have a maximum switching frequency of approximately 20 kHz when switching a load. By applying the zero volt switching technique of the present invention, switching frequencies well beyond the rated 20 kHz have been achieved. The preferred operating frequency of the present circuit if 50 kHz, as previously mentioned.

Figures 1A, 2:
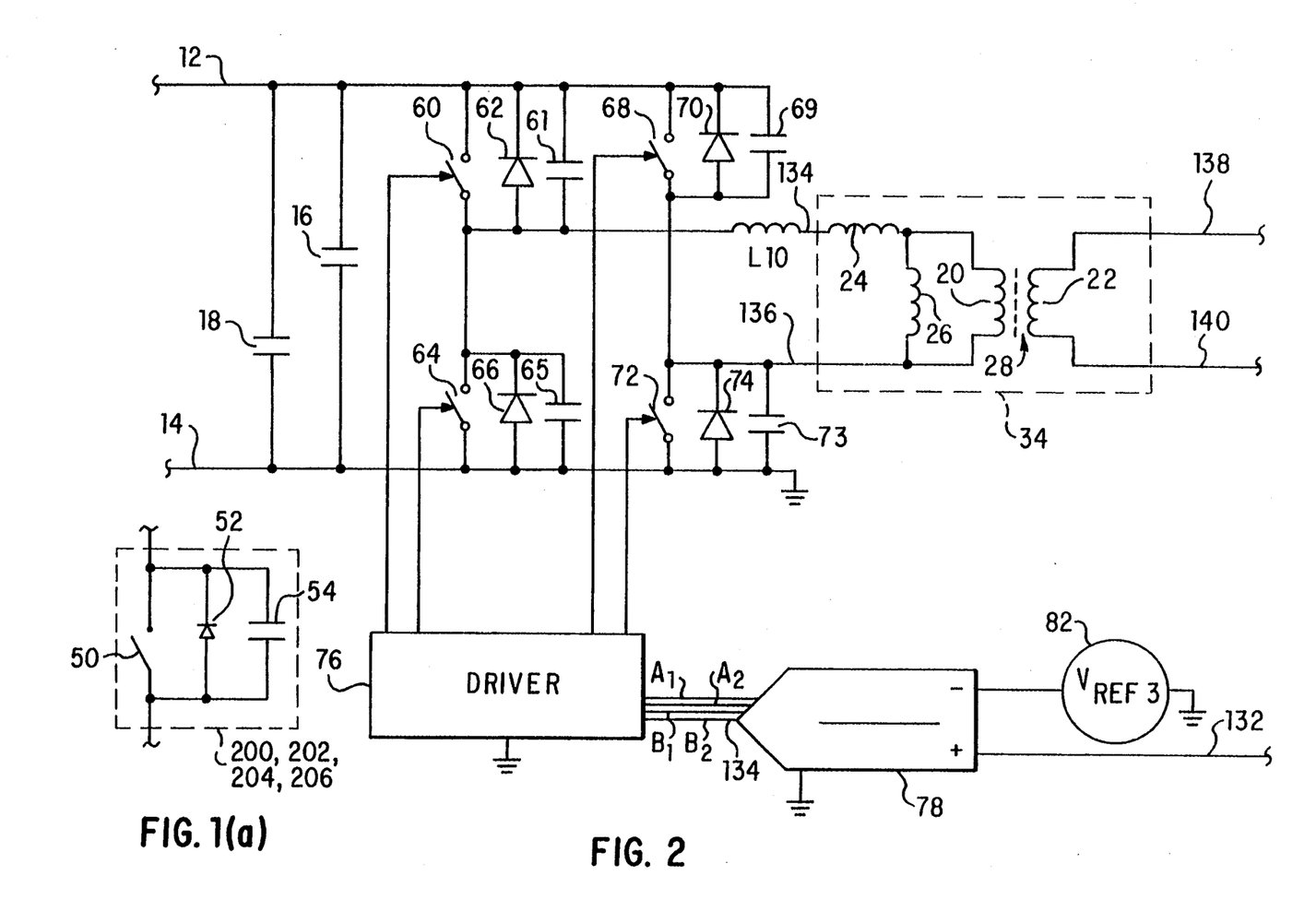
FIG. 1(a) is a schematic diagram of the switching elements of the circuit in FIG. 1.
FIG. 2 is a schematic diagram of the switching matrix, transformer and feedback circuitry of another embodiment of the invention with a feedback loop.

Switching elements 200, 202, 204 and 206 are configured as shown in FIG. 1(a). The capacitors 54 are generally referred to as snubber capacitance.

Storage capacitance 18 and filter capacitance 16 as shown in FIG. 2 may be employed across the DC input lines 12 and 14. A similar capacitor configuration can be inserted in the circuit shown in FIG. 1. Capacitance 16 is preferably composed of several multilayer ceramic capacitors which are integrated into the switching element bus structure in order to control voltage overshoots which may be caused by the very fast switching times employed. Capacitor 18 is preferably comprised of a number of low ESR electrolytic capacitors. Capacitor 18 is intended to store sufficient energy to maintain the input voltage level to the switching elements. This energy storage characteristic is typically referred to as a specified power outage ride through requirement.

Switching elements 200 and 206 are simultaneously activated in order to apply the DC voltage from lines 12 and 14 across the primary of transformer 34. An additional inductor, L10 may be added to balance the leakage inductance of the circuit. Because of the inductive nature of both of these devices, current will not flow instantly. After several time constants have passed, and current is flowing through inductor L10 and the primary of transformer 34, switching elements 200 and 206 are shut off switching elements 202 and 204 are activated after the capacitors in parallel with switching elements 200, and 206 are changed.

This reverses the polarity of the signal applied to inductor L10 and the primary of transformer 34. Again, since the flow of current cannot change instantaneously through an inductive element, there is a slight time delay as the current flow through inductor L10 and the primary of transformer 34 is reversed. After several time constants, switch elements 202 and 204 are shut off and switch elements 200 and 206 are activated again.

Switch activation of switch elements 200, 206 and 202, 204 are controlled by oscillator 212 through drivers 208 and 210 as shown in FIG. 1. In one preferred embodiment, the frequency of oscillator 212 is predetermined based on the magnetizing inductance and leakage inductance of transformer 34 in conjunction with the capacitors which are connected to switching elements 200, 202, 204, and 206.

As the current flow through inductor L10 and the primary of transformer 34 is constantly reversed, a matching current flow is developed through the secondary of transformer 34. The voltage appearing across transformer 34 is switched by switching elements 220, 226 and 222, 224. These complimentary switching elements behave in the same manner as switching elements 200, 206 and 202, 204. When switching elements 220 and 226 are closed, one polarity of the secondary of transformer 34 is driven across output lines 221 and 223. When switch elements 220 and 226 are opened, and switch elements 222 and 224 are closed, the reverse polarity of the voltage across the secondary of transformer 34 is applied to lines 221 and 223. Switch elements 220, 226 and 222, 224 are turned on and off by oscillator 232 through drivers 228 and 230, as shown in FIG. 1.

To efficiently couple energy across transformer 34, it is preferable to synchronize oscillator 212 with oscillator 232. In synchronizing these two oscillators, oscillator 212 will lead oscillator 232 by a predetermined phase amount. Preferably, oscillator 212 will lead oscillator 232 by an appropriate amount in order to assure that the voltage across the secondary of transformer 34 is zero volts when switching elements 220, 226 or 222, 224 are activated. This will ensure that only a positive voltage is applied to line 221 and only a negative voltage is applied to line 223.

During operation of switching elements 200, 202, 204 and 206, the direction of current flow through the primary of transformer 34 is alternately reversed. Switching elements 200, 202, 204 and 206 are preferably comprised of a switching element 50, such as an IGBT, high power FET, or the like, a snubber capacitance 54, and an over voltage protection diode 52. During operation of the switching elements, current will flow through the switching element and through transformer 34 until the switching element is opened, and the circuit broken. Because of the inductive characteristics of transformer 34, current flow will not stop instantaneously. This continue current flow will cause an increase in voltage which will charge capacitor 54. If the current is sufficiently large, capacitor 54 will charge to a voltage level greater than the voltage applied to the DC input across lines 12 and 14. This will cause current to flow through diode 52, effectively clamping the voltage across the capacitors to the DC rails established across lines 12 and 14. At this point and time, the alternate pair of switching elements are activated, and current begins to flow through transformer 34 in the opposite direction in which it had previously flowed. Capacitors 54 then discharge, dumping their energy back through transformer 34. In this manner, there is theoretically zero volts across each of the switching elements when they are actuated. In actuality, a forward diode drop of approximately 0.7 volts will exist across each of the switching elements, or a total of 1.4 volts across the two switching elements in series with the primary of transformer 34.

In order to ensure operation of the switching elements and capacitor pairs as described above, it is necessary to ensure that a minimum current flow occur through transformer 34 in order to charge capacitor 54. In order to guarantee that this minimum current flows, a shunt inductance is built into the primary of transformer 34. Shunt inductance and leakage inductance are typically terms which are associated with the small signal modeling of a transformer.

In one embodiment, the switching elements employed are IGBT's and have a shut off time of approximately 100–200 nanoseconds (nS). Snubber capacitance is chosen so that the current flow is maintained for approximately 1.5 microseconds after the switch is shut off. The shunt inductance is selected to ensure minimum current flow sufficient to charge the capacitor even when there is no load being applied to the secondary coil of the transformer.

Interestingly, the inventors have discovered that the circuit shown in FIG. 1 can readily be driven in reverse, transferring energy from lines 221 and 223 to lines 12 and 14 by having the phase of oscillator 232 lead the phase of oscillator 212. Coupling through transformer 34 will occur from the side of transformer 34 which has first had the switching elements activated to the side of transformer 34 which next has the switching elements activated.

The signal present across lines 221 and 223 will take the form of a pulsed DC waveform. The filter network 40, shown in FIG. 1, filters the voltage input on lines 221 and 223 to a cleaner DC waveform on lines 56 and 58. Alternatively, a rectifier or other filter configuration could be employed. If desired, switching network 36 can be replaced by a full wave rectifier, or half wave rectifier, using conventional AC to DC conversion technique. That type of conversion is far less efficient than the circuit presently employed which achieves an energy transfer efficiency of approximately 94–95%.

DC to AC conversion may be accomplished by having oscillators 223 and 212 operate at different frequencies. The difference between them will be a "beat" frequency which is output across lines 221 and 223. A low pass or high pass filter (not shown) then smoothes the output AC signal.

Figure 3:
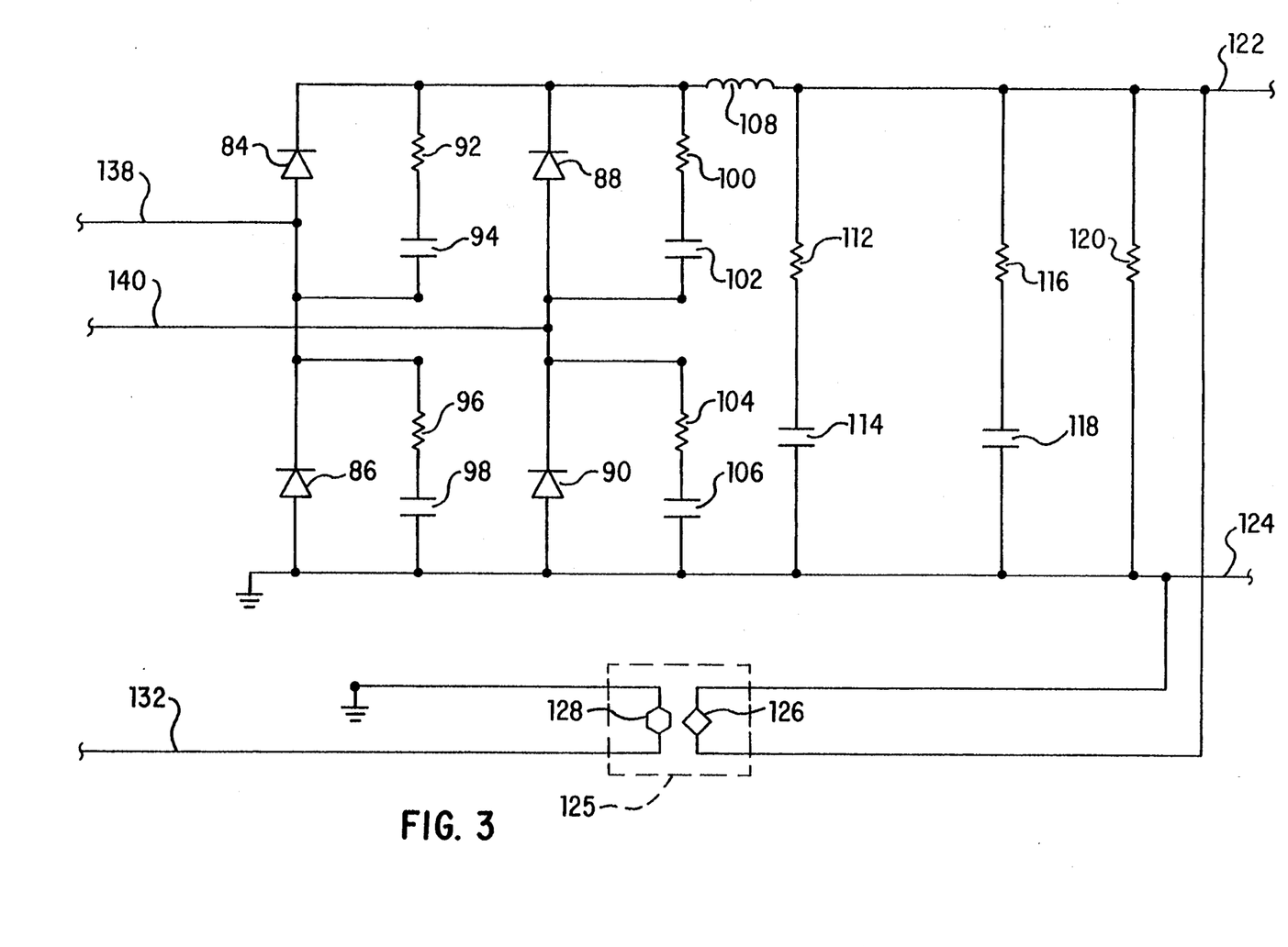
FIG. 3 is a schematic diagram of a full wave bridge rectifier AC to DC converter with the feedback tap shown.

Another embodiment of a DC to DC converter is shown in FIGS. 2 and 3. The embodiment shown in FIGS. 2 and 3 employs a switching matrix connected to the primary of transformer 34 which is similar to that shown in FIG. 1, however, the switching elements are each individually controlled by a driver network. The secondary of transformer 34 drives a full wave rectifier network shown in FIG. 3 in order to create a pulsed DC waveform which is then filtered to produce a stable DC output across lines 122 and 124. The stable DC output is monitored by the feedback loop connected across lines 122 and 124. The feedback loop ensures that the voltage across lines 122 and 124 does not vary, even if loads are being actively switched. The feedback network selectively activates the switching elements in order to ensure that enough energy is transferred to transformer 34 to provide the DC voltage level required at lines 122 and 124.

In the configuration shown in FIG. 2, each of the switching elements are connected in parallel with a diode in order to dissipate the back EMF which may be generated by inductor L10 and the primary of transformer 34. Unlike the DC to DC converter shown in FIG. 1, the DC to DC converter of FIGS. 2 and 3 can only operate in one direction, that is, energy can only be transferred from lines 12 and 14 through transformer 34 to lines 122 and 124. There is no switching matrix on the secondary side of transformer 34 to reverse the current flow through transformer 34 which would be required to transfer energy from lines 122 and 124 to lines 12 and 14. The configuration shown in FIGS. 2 and 3 is not as energy efficient as the configuration shown in FIG. 1 due to the energy loss between the output of the secondary of transformer 34 and lines 122 and 124.

Operation of the embodiment of the DC to DC converter shown in FIG. 2 is similar to operation of the embodiment of FIG. 1. A DC input is supplied across lines 12 and 14, and a matrix of switching elements 60, 64, 68 and 72 are activated in pairs in order to generate an AC signal across the primary of transformer 34. Switching elements 64 and 68 are activated at the same time and switching elements 60 and 72 are activated at the same time. All four switching elements are not activated at the same time. Over voltage protection diodes 62, 66, 70 and 74 function in a manner identical to operation of diodes 52 in switching elements 200, 202, 204 and 206 as shown in FIG. 1. Similarly, capacitors 61, 65, 69 and 73 serve as snubber capacitors in a manner identical to operation of capacitors 54 which is part of switching elements 200, 202, 204 and 206 as shown in FIGS. 1 and 1a.

An inductor L10 may be inserted in series with transformer 34 in order to provide additional leakage inductance to balance the configuration of the snubber capacitors 61, 65, 69 and 73 with the leakage inductance 24 and magnetizing or shunt inductance 26 which are inherent in transformer 34.

The output of the secondary 22 of transformer 34 is an AC signal which is applied across lines 138 and 140. Referring now to FIG. 3, lines 138 and 140 are connected to a conventional type diode bridge array comprised of diodes 84, 86, 88 and 90. An RC filter is located in parallel with each of the diodes of the diode bridge. Resistor 92 and capacitor 94 are in parallel with diode 84. Similarly, resistor 96 and capacitor 98 are in parallel with diode 86. Resistor 100 and capacitor 102 in parallel with diode 88, and resistor 104 and capacitor 106 in parallel with diode 90.

The RC filter networks help minimize noise which may be present due to the high frequency AC signal, and the high switching speeds involved. The parallel RC networks formed by resistor 92 and capacitor 94 across diode 84 are typically only required when diodes which have snappy recovery characteristics are employed in a rectifier bridge as diodes 84, 86, 88 and 90. In order to avoid this problem, soft recovery diodes such as SGS-Thompson BYV255V200 type diodes are preferably employed. These soft recovery type diodes do not have the overshoot or other switching speed noise generation characteristics which are typical of snappy recovery type diodes.

It is recognized that soft recovery type diodes may not always be available, and for that reason, a parallel resistor capacitor configuration is shown in association with each of the diodes 84, 86, 88 and 90. Additional inductive elements 108 and 110 and RC network 112 and 114 as well as RC network 116 and 118 provide additional filtering to smooth the DC output signal presented across lines 122 and 124. The output across lines 122 and 124 provides an input to isolation circuit 125. The input of isolation circuit 125 is a optical isolation device having an input 126 and an output 128. In this manner, the output current is monitored so that the appropriate switching elements 60, 72 or 68, 64 are selected.

The output of isolator 125 is present on lines 130 and 132. The output of isolator 125 is preferably an op amp, or other isolation type device which can be used to proportionally decrease the voltage across lines 122 and 124 to a level compatible with the subsequent controller circuitry connected to line 132, the output of isolator 125. In certain instances, an optical isolator may be employed in which the voltage across the input 126 creates a proportional output generated by detector 128.

Referring to FIG. 2, the signal on line 132 is routed to a reference and select circuit comprised of a voltage reference 82 and a controller 78. Controller 78 provides inputs to driver 76 through select lines 134. Controller 78 is preferably a Micro Linear ML4818 phase modulation/soft switching controller which is preferably configured in the voltage mode. Both pulse by pulse and integrating current limiting may be implemented in the Micro Linear ML4818 by sensing the current through the primary of the transformer with a hall effect current sensor and a precision rectifier.

The micro linear ML4818 can be configured to have different current limits, trigger voltages and time delays. In the embodiment shown in FIG. 2, the ML4818 is configured to have a time out current limit of approximately 100 amps, and an instantaneous current shut off of 150 amps. The output voltage is programmed for 58 volts. The output time delay between the actuation of the two pairs of switching elements is programmed for 1 microsecond, and a clock frequency of approximately 50 kilohertz. A soft start or ramp up is set for 100 milliseconds.

Figure 3A:
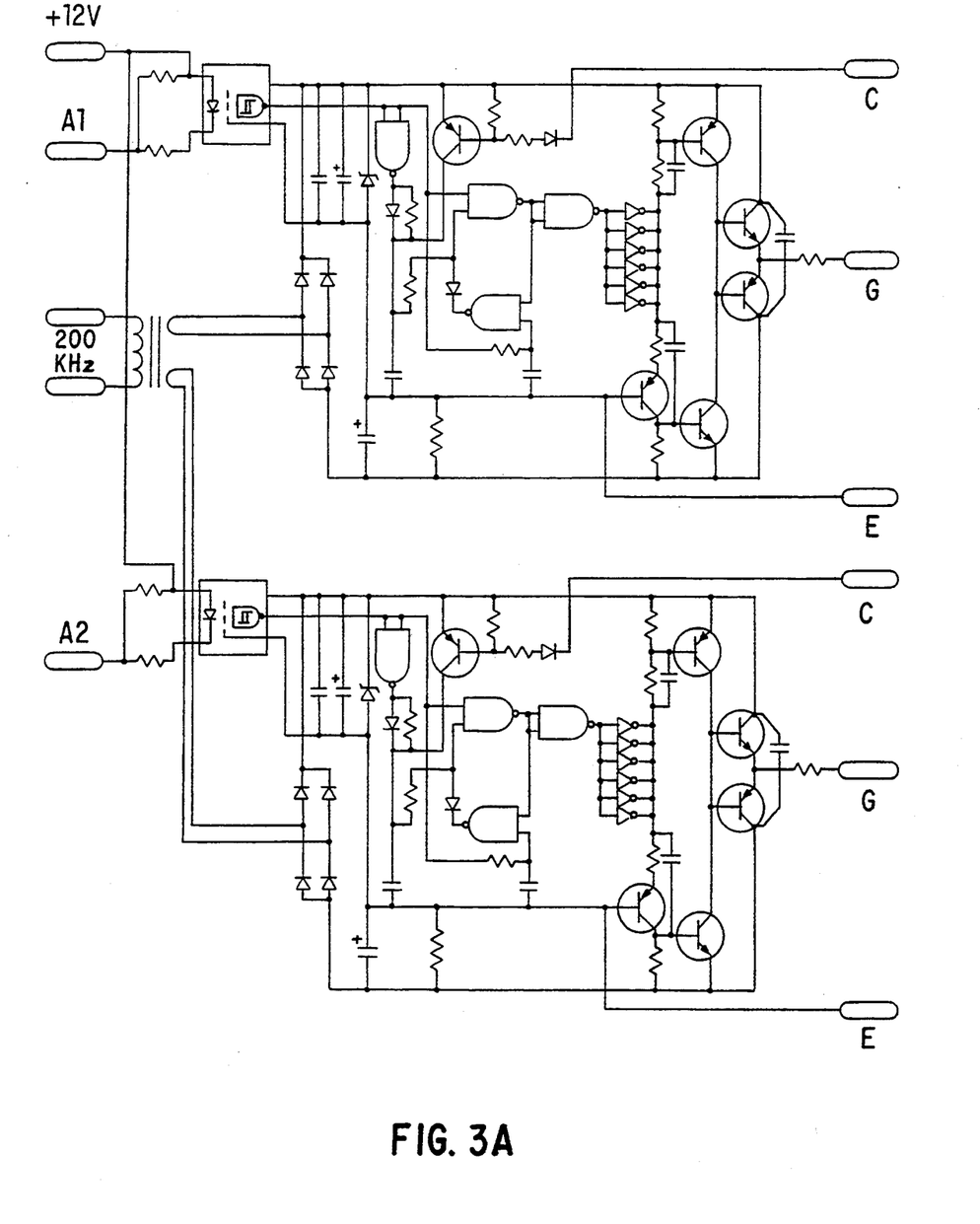
FIG. 3(a) is a schematic diagram of the driver circuit of FIGS. 1 and 2.

The Micro Linear ML4818 drives four output lines, A1, A2, B1 and B2. Each of the output lines are routed through driver 76. A partial configuration of driver 76 is shown in FIG. 3a. While only the A drivers are shown in this configuration, a similar driver network is employed to drive the B drivers. This same driver is employed as drivers 208, 210, 228 and 230 in FIG. 1. The drivers are actuated by applying a low, or ground signal to the input of the driver package. The input low draws current from a 12 volt reference source through an optical isolator. The output of the optical isolator drives the balance of the driver network.

The driver circuit 76 in one embodiment is an all discrete circuit which employs high CMRR optoisolators from Hewlett Packard which are used to transfer on/off signals to the driver circuit while simultaneously providing electrical isolation between the input and output. Power is supplied to the driver circuit by a 200 kHz, 24 volt AC signal which is routed through a full wave rectifier bridge.

The driver configuration shown in FIG. 3a incorporates certain protection features, such as desaturation (desat) protection. The driver network senses the voltage across the collector and emitter lines of the switching element. These lines are labeled in FIG. 1a for clarity, however, the remainder of the switching elements are unlabeled. If the voltage across the collector and emitter ($V_{ce}$) get too high, the driver network will shut off the circuit, presuming that an overload condition has occurred. A decoupled push pull driver network drives the gate of each of these switching elements.

Several NAND gates are configured to provide a hysterysis circuit to prevent the driver network from generating more than one on or off pulse during each transition of the input.

Referring now to the output configuration shown in FIG. 3, the physical layout and configuration of the components is fairly significant when dealing with the high frequency switching speeds of the present invention. A depiction of the physical configuration of the transformer is shown in FIGS. 4–7 and the configuration of the power distribution bus is shown in FIGS. 8–11. Preferably, each of the diodes 44, 46, 48 and 50 shown in FIG. 8 are identical to diodes 84, 86, 88 and 90 shown in FIG. 3. Capacitors 62, 66, 70, 74 and 78 are preferably each 30 microfarad, 100 volt low ESR multi-layer ceramic (MLC) capacitors from the AVXSMPS series. These capacitors combine together to form a 150 microfarad capacitance 114 as shown in FIG. 3. Series resistance 112 is approximately 0.12 milliohms. Capacitors 64, 68, 72, 76 and 80 shown in FIG. 8 are each 2700 microfarad, 100 volt capacitors which combine to form a 13,500 microfarad capacitance 118 shown in FIG. 3. Series resistance 116 is approximately 3.6 miliohms. Inductor 108 shown in FIG. 3 is approximately 4.5 microhenris. When required with the use of "snappy" diodes in order to dampen voltage transients, resistors 92, 96, 100 and 104 are each approximately 10 ohms, and capacitors 94, 98, 102 and 106 are each approximately 0.001 microfarads.

The configuration of the transformer and the switching frequency may not be critical in many applications. However, in order to achieve high efficiency in the transfer of power from the incoming DC signal across lines 12 and 14 (approximately 400 volts in one embodiment), and the output of the DC converter across lines 122 and 124, it has been found that the higher the frequency at which the transformer is operated, the more efficient the power transfer.

Figure 4:
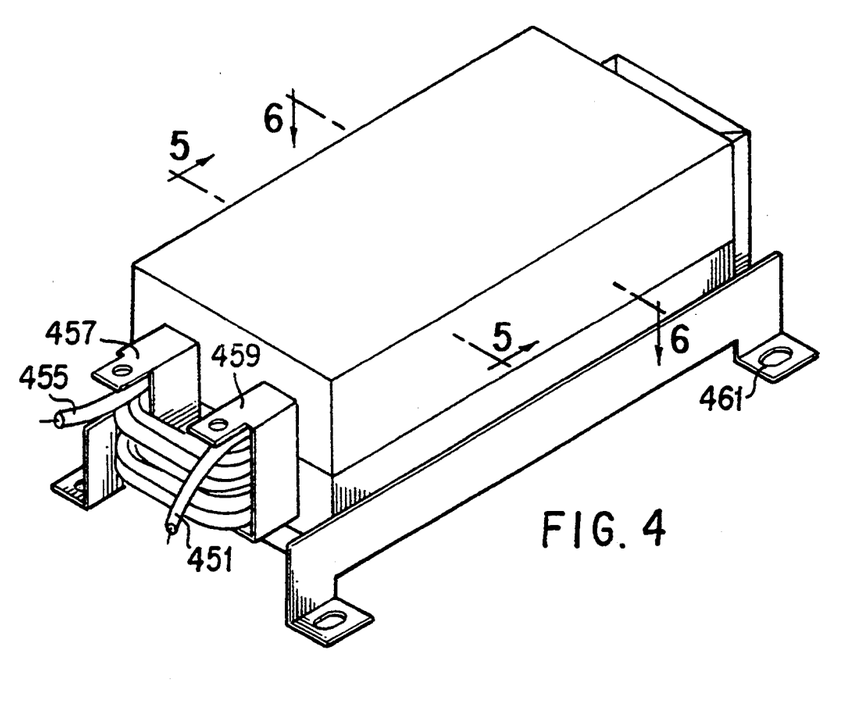
FIG. 4 is a perspective view of the transformer of the present invention.

Referring to FIG. 4, one preferred embodiment of the transformer employed with the present invention is formed by placing a primary winding surrounding a secondary winding inside a high magnetic permeability housing. Primary winding 412 is rectangular in shape and runs the length of the transformer. Portion 418 of primary winding 412 extends beyond high magnetic permeability material 414 to allow the transformer to dissipate heat which would otherwise be contained within high magnetic permeability housing 414, and to prevent an electromagnetic field from being established within high magnetic permeability material 414 which is perpendicular to the electromagnetic field generated by the lengthwise segment of primary winding 412. Bracket 416 provides for mounting of the transformer in an appropriate location on a circuit assembly.

Figure 5:
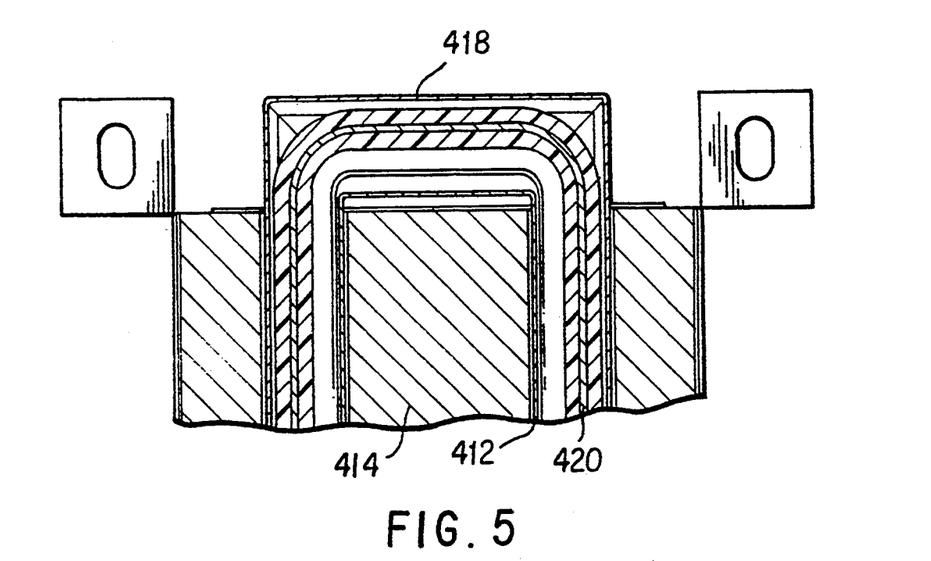
FIG. 5 is a top view of the end of the transformer shown in FIG. 4.

Referring to FIG. 5, the secondary winding 420 is shown as it rests within the channel defined by primary winding 412. High magnetic permeability material 414 surrounds the portion of the transformer which runs lengthwise. The section of primary winding 412 which is not enclosed within high magnetic permeability material 414 is more clearly shown than in FIG. 4. This portion 418 of primary winding 412 is spaced apart from high magnetic permeability material 414. Secondary coil winding 420 remains contained within primary coil winding 412 through Section 418 of primary coil winding 412.

Figure 6:
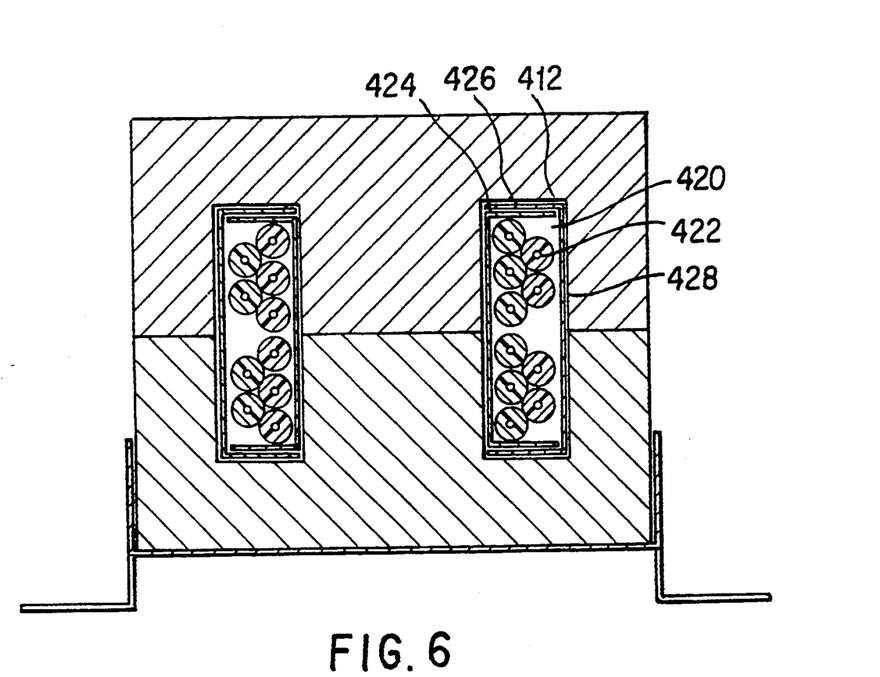
FIG. 6 is a cross-sectional view of the transformer shown in FIG. 4.

Referring to FIG. 6, the individual wires 422 of coil winding 420 are shown as they are contained within the cross-section of primary coil winding 412. Primary coil winding 412 is made up of several U-shaped channels 424, 426, and 428 which surround secondary coil winding 420. U-shaped member 426 surrounds the portion of secondary winding 420 on the side of secondary winding 420 which is opposite U-shaped member 424. Similarly, material 428 surrounds U-shaped material 426. Preferably, U-shaped material 424, 426, and 428 are copper strips approximately 0.032 inches thick formed of a dead soft grade copper, type CU110. This results in a highly conductive, low resistivity primary coil winding 412.

Figure 7A:
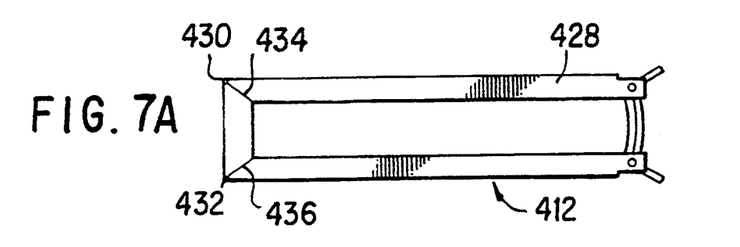
FIG. 7(a) is a bottom view of the primary winding of the transformer shown in FIG. 4.
Figure 7B:
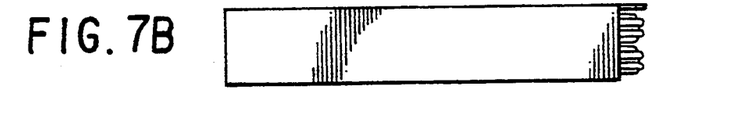
FIG. 7(b) is a side view of the primary winding of the transformer shown in FIG. 4.
Figure 7C:
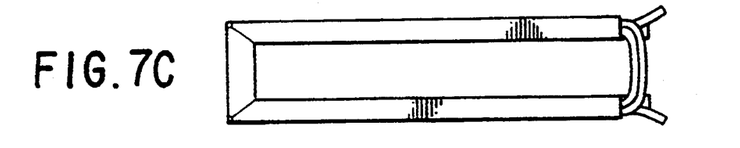
FIG. 7(c) is a top view of the primary winding of the transformer as shown in FIG. 4.
Figure 8:
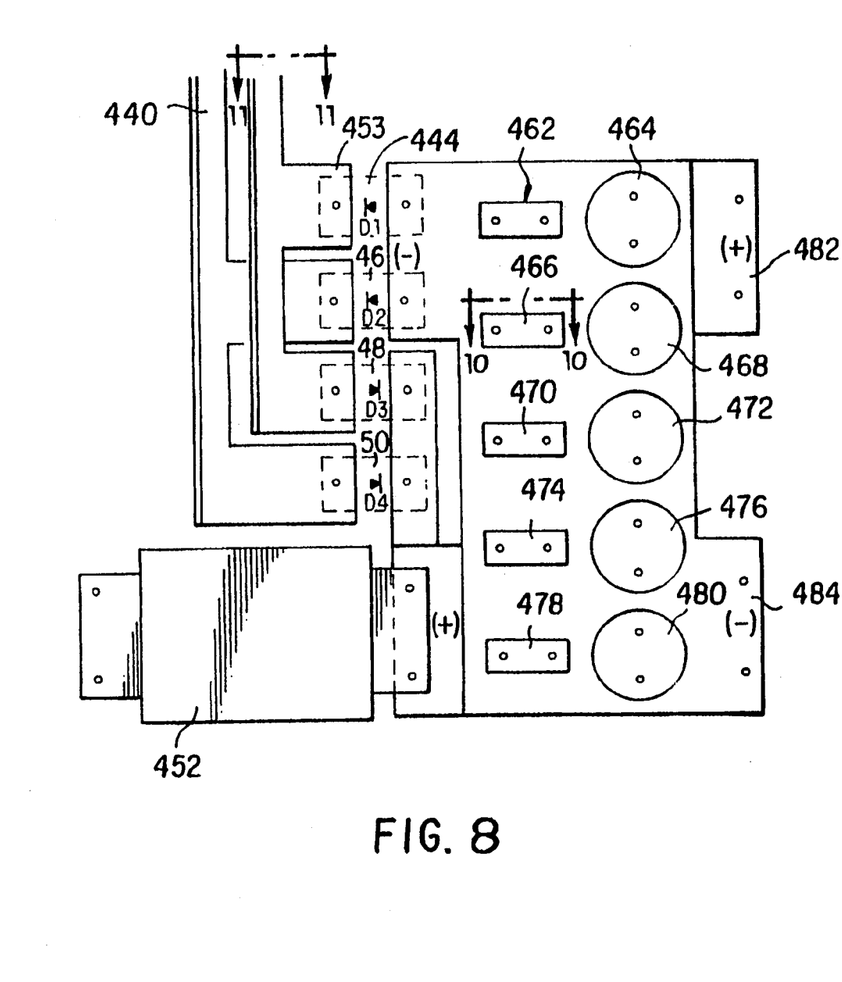
FIG. 8 is a top view of the layout of the power conversion system attached to the transformer.

The channel member illustrated in FIGS. 7a–c is the outside, surrounding member 428 which surrounds U-shaped members 424 and 426. The corner portions 430 of channel members 424, 426, and 428 are formed by notching and bending continuous strips of copper material. Corners 430 and 432 are necessary to establish the shape of primary winding 412. Corners 430 and 432, as well as joints 434 and 436 are soldered in order to enhance the electrical continuity of the channel member 428 and then ground smooth in order to avoid generating spurious electromagnetic fields. Grinding the joints smooth also allows viewing joints 434 and 436 to ensure that a good solder contact has been created during the manufacturing process. This ensures consistent quality of the finished product and repeatable characteristics of the transformers as they are manufactured in large quantity.

Secondary coil winding 420 is made up of a number of coils of wire 422 which are made about a bobbin or form.

The particular high magnetic permeability materials selected for use in preferred embodiments of the present invention are: a series #75 type material and a transformer core material M3C85 from Phillips Corp. Numerous other types of high magnetic permeability material exist with characteristics similar to series E75, and can be readily employed in the present invention. The particular wire 422 selected is round Litz (Nelc660/38SPDN) having a outer diameter of approximately 0.150 inches. Coil 420 is formed by 10 turns of wire 422 arranged in the configuration as shown in FIG. 6. The inventors recognize that numerous other types of wire, including varying thicknesses of the core, varnish coating, conductivity of the wire, conductor material and number and orientation of the windings of the secondary coil can be employed. The particular selection of the number of secondary windings depends on the desired transforming ratio.

The preferred embodiment of the present transformer has an overall length of approximately 5½ inches including mounting brackets 416, and is approximately 2.4 inches wide, not including mounting bracket 416. The overall height of the transformer of the preferred embodiment is approximately 2.3 inches, not including mounting bracket 416. The primary coil winding is approximately 0.45 inches wide and 1.8 inches high and is formed in a U-shape with Section 418 representing the base of the U.

The preferred transformer design enable superior operation and highly efficient energy transfer from the primary winding to the secondary winding at high frequencies, typically in the area of 50 kilohertz. This operating range is difficult for prior art transformers to achieve because of the high frequencies involved, and the parasitic effects of most primary and secondary coil windings, and the high magnetic permeability material that couples them together. The present invention provides superior operating results by substantially encapsulating the secondary coil winding within the primary coil winding, creating an integral coil assembly.

By surrounding the length of the integral coil assembly with high magnetic permeability material, the flux linkage capabilities of the present transformer are enhanced. This enhancement is effective as long as the flux linkage is only in one plane, or direction. By locating the segment of the integral coil assembly which is perpendicular to the length of the integral coil assembly outside of the high magnetic permeability material, any interference which may be introduced by generating an electromagnetic field in the portion of the integral coil assembly which is perpendicular to the electromagnetic field generated by the length of the integral coil assembly is minimized.

Additional benefits of locating this portion of the integral coil assembly outside of the high magnetic permeability material include the ability of the integral coil assembly to rapidly cool, dissipating the heat generated by the inefficiencies in coupling the electromagnetic signal created in the primary 412 of the integral coil assembly with the secondary 420 of the integral coil assembly. A minimum amount of energy loss between the primary and secondary coil windings is expected as the magnetic alignment of the atoms within the coil elements is rapidly changed.

Surrounding the integral coil assembly with high magnetic permeability material enhances the flux coupling between the primary and secondary windings, but limits the surface area available to dissipate heat. Additionally, most high magnetic permeability material has a relatively high thermal resistance and generates a thermal gradient between the outer layer 428 of the integral coil assembly and the outside surface of high magnetic permeability material 414. This thermal gradient can become quite large depending on the selection of materials.

It is desirable to minimize the temperature at which the transformer of the present invention operates. Electromagnetic coupling is more efficient when the windings are operating at low temperatures. This is in part because the entropy of the atomic structure of the coil windings is less, making it easier to alter their magnetic alignment without undue energy loss. As previously stated, forcing the atomic particles of the primary and secondary windings to alter their magnetic orientation generates a certain amount of inter-atomic friction. This friction is exhibited as heat produced by the transformer. Additionally, the resistance (R) of each of the coil windings will contribute to a power (IR) drop which exhibits itself as joule heating.

Referring now to FIGS. 8-11, there is shown a stripline layout which is connected to the output of the transformer of the present invention, such as the embodiments shown in FIGS. 7-10. Output terminals 440 and 442 of the transformer are physically extended, as shown in FIG. 8. The extension of the bus structure is formed by several layers of copper 490 and 494 which are separated by an insulating layer 492. Additional insulating layers and conductors can be added to the configuration shown in FIG. 9 as required by the power factor of the circuit. Tabs 453 and 458 are physically formed in conjunction with the extension of transformer output 442 and provide electrical connection to switching elements 444 and 448, respectively, which may be diodes D1 and D3, as shown in FIG. 8, or may be IGBT's, FET's or other switching elements.

Tabs 454 and 460 are similarly formed in conjunction with the extension of output 440 of the transformer shown in FIG. 4, and are used to interconnect the transformer to switching elements 446 and 450 which may be diodes D2 and D4 as shown in FIG. 8, or may be IGBT's, FET's or the like. The use of the laminated structure shown in FIGS. 8 and 9 serves to minimize the parasitic effects that the output wiring of a high frequency, high power transformer would normally suffer.

Figure 9:
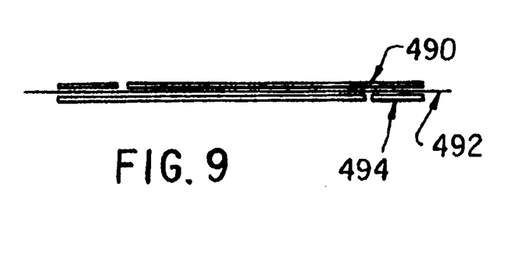
FIG. 9 shows the lamination of the conductors forming the bus members.

The thickness of copper elements 490 and 494 are preferably calculated to be the thickness of two skin depths based on the frequency and power output by the transformer. At frequency and power output a thickness of the conductor 490 or 494 which is greater than two skin depths does not significantly contribute to the conductivity of the output bus 440 or 442, and introduces undesired parasitic capacitance and inductance into the circuit. The thickness of the copper is thus calculated to minimize the losses due to the high frequency and high power being transferred through bus 440 and 442.

The diodes D1, D2, D3 and D4, shown in FIG. 8, are configured in a full wave rectifier bridge and establish a negative terminal on bus 484 and a positive terminal on bus 482 of the outputs. An array of capacitors 462, 464, 466, 468, 470, 472, 474, 476, 478 and 480 are strategically placed within the planer surface of the positive and negative buses to provide a distributed capacitance which is employed to store energy transferred to bus 482 and 484 by the diode matrix D1-D4. Buses 482 and 484 can be referred to as supply and return buses, respectively, and are bonded to opposite sides of an insulating material as shown in FIG. 10.

Figure 10:
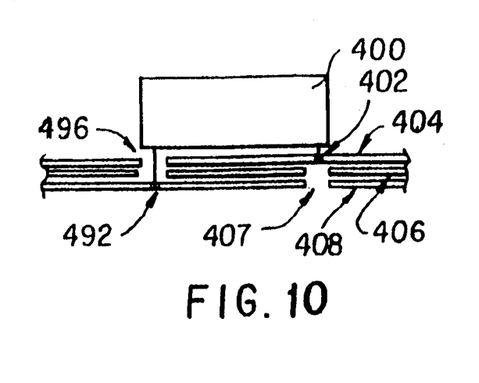
FIG. 10 is a cross sectional view showing the assembly of a capacitor into the bus structure of FIG. 8.

The leads of capacitors 462-480 are represented by capacitor 400 in FIG. 10. The capacitors are affixed to the supply and return buses which are formed of the laminated structure shown in FIG. 10. Preferably, bonding capacitor 400 is accomplished by soldering the legs of capacitor 400 to the underlying supply and return bus at points 498 and 402. In order to effectively bond capacitor 400 to the underlying supply and return bus, a first space 496 and a second space 407 are formed in the conductors underlying capacitors 400.

The underlying supply and return buses 484 and 482 are separated by an insulating layer which has a dielectric constant and thickness sufficient to withstand the voltage applied between the power and return buses. In FIG. 10, the buses are shown as a top layer 404 and a bottom layer 408 separated by an insulating material 406. In the embodiment shown in FIG. 9, layer 404 would correspond to return bus 484 and layer 408 would correspond to supply bus 482. It is recognized that the supply and return buses can be readily reversed, can that the supply bus an be routed to top layer 404 and the return bus routed to bottom layer 408.

The geometry of the bus is designed so that the supply currents and the return currents flow in a parallel direction causing the inductive effects of the bus to be canceled out. Any additional filter components such as capacitors or inductors are integrated into the bus structure in order to maximize their effect on the transient or AC currents which flow through the bus structure.

In this manner, a distributed capacitance is created by the parallel orientation of supply bus 482 and return bus 484 separated by an insulating material (such as insulating material 406). Inductive characteristics of the supply and return bus are controlled by varying the thickness of the bus layers.

Figure 11:
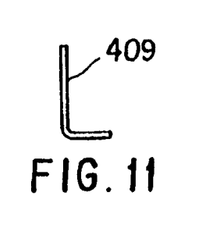
FIG. 11 is a cross sectional view of the bus shown in FIG. 8.

To provide additional strength to bus members 440 and 442 by bending bus members 440 and 442 into an L shaped bracket 409 as shown in FIG. 11.

In one embodiment of the present invention, the width of the positive power bus 482 is approximately 6.5 inches, as is the width of the negative power bus 484. The width of the positive bus and the negative power bus are measured across the area from capacitor 464 to capacitor 480. An insulator located between the positive power bus and the negative power bus preferably has a width of 6.625 inches in order to ensure some overlap of the insulator and prevent tangential arcing along the outer parameter of the positive bus and the negative power bus. The length of the positive power bus and negative power bus is measured from the diodes 444, 446, 448 and 450 to the attachment point of the positive power bus and negative power bus, where reference designators 482 and 484 are indicated. This length in one embodiment is 5 inches. In addition, the cut out or indentation which is most apparent towards the center of the positive and negative power bus is ¾ of an inch shorter on each side than the adjacent tabs. In particular, this means that the length across the center of the positive power bus and negative power bus is approximately 3.5 inches and that the tab of the positive power bus where reference designator 82 is located extends approximately ¾ of an inch beyond the negative power bus. Similarly, the tab where reference designator 84 is indicated extends approximately ¾ of an inch beyond the positive power bus.

There has been described hereinabove a particular embodiment of a novel DC to DC/DC to AC power converter. Those skilled in the art may now make numerous uses of and deviations from the above-described embodiment including varying the shape and aspect ratio of the magnetically permeable material without departing from the scope of the inventive concepts which are defined solely by the following claims.

What is claimed is:

1. A high efficiency power conversion system comprising:
   a. first and second input terminals serving as a supply side of said power conversion system;
   b. a transformer having a primary winding and at least one secondary winding, said primary winding having at least a first and second input line, the at least one secondary winding having at least a first and second output line;
   c. a first switching matrix having at least two switching elements, each input terminal connected to at least one switching element and at least one energy storage element located in parallel with each of said switching elements, said first switching matrix connected to said first and second lines of said primary and wherein the switching matrix applies an alternating signal to the primary winding of the transformer;
   d. at least one set of output lines having a first output line and a second output line serving as a load side of said power conversion system;
   e. a second switching matrix connected to said first and second leads of said secondary winding of said transformer for providing an output waveform from the secondary winding of the transformer;
   f. a first control circuit for controlling said first switching matrix to apply an alternating signal to the transformer;
   g. a second control circuit for controlling said second switching matrix to convert said alternating signal to a power output signal to said output lines;
   h. wherein said power conversion system is selectively functional as a DC to DC converter and as a DC to AC converter; and
   i. wherein said power conversion system is bidirectional, allowing power to be converted from the supply side to the load side and from the load side to the supply side.

2. The system of claim 1 wherein said second switching matrix includes at least two pairs of switching elements connected to at said first and second leads of the secondary of the transformer and having at least a first and second configuration, wherein said first configuration connects said first lead of said secondary of said transformer to said first output line while simultaneously connecting said second lead of said secondary of said transformer to said second output line, and wherein said second configuration electrically connects said second lead of said secondary of said transformer to said first output line while simultaneously connecting said first lead of said secondary of said transformer to said second output line.

3. The system of claim 2 wherein said second control circuit includes an oscillator for controlling said second switching matrix.

4. The system of claim 1 wherein the output matrix comprises a rectifying matrix for converting the waveform from the transformer to a direct current waveform.

5. The system of claim 1 wherein said first control circuit includes a first oscillator for driving the first switching matrix such that said switching elements change from the first configuration to the second configuration when the voltage across the switching element is approximately zero.

6. The system of claim 1 wherein the switching elements in the first switching matrix includes snubber circuits.

7. The system of claim 1 wherein the output matrix and the secondary winding of the transformer are coupled together by a bus structure.

8. The system of claim 7 wherein the secondary winding of the transformer includes output terminals extended from the transformer and wherein the bus structure includes a plurality of conducting layers separated by corresponding insulating layers.

9. The system of claim 8 wherein the output terminals include tabs for coupling the output of the transformer to the switching elements.

10. The system of claim 7 wherein the filter is also coupled to a bus structure 1 including at least first and second conducting layers separated by an insulating layer, and wherein the thickness of the conducting layers are approximately two skin thicknesses.

11. A high efficiency power conversion system comprising:
   a. input terminals serving as a supply side of said power conversion system;
   b. a transformer having a primary winding and at least one secondary winding, said primary winding having at least a first and second input line, the at least one secondary winding having at least a first and second output line;
   c. a first switching matrix electrically coupled between said input terminals and said primary winding, said first switching matrix for applying an alternating signal to said primary winding of the transformer;

d. output terminals serving as a load side of said power conversion system, said output terminals comprising a first output line and a second output line;

e. a second switching matrix electrically coupled between said secondary winding and said output terminals, said second switching matrix for providing an output waveform from the secondary winding of the transformer;

f. a first control circuit for controlling said first switching matrix to apply an alternating signal to said primary winding of the transformer;

g. a second control circuit for controlling said second switching matrix to convert said alternating signal to a power output signal to said output lines;

h. wherein said power conversion system is selectively bidirectional, allowing power to be converted from the supply side to the load side and from the load side to the supply side; and i. wherein said power conversion system is selectively functional as a DC to DC converter and as a DC to AC converter.

12. The power conversion system of claim 11 wherein said first control circuit includes a first oscillator for driving said first switching matrix and said second control circuit includes a second oscillator for driving said second switching matrix.

13. The power conversion system of claim 12 wherein said first oscillator and said second oscillator produce drive command signals at the same frequency.

14. The power conversion system of claim 13 wherein said second oscillator produces drive command signals that are phase delayed signals derived from said first oscillator, causing energy to be transferred from the primary winding of said transformer to the secondary winding of said transformer, allowing power to be converted from the supply side to the load side of said power conversion system.

15. The power conversion system of claim 13 wherein said first oscillator produces drive command signals that are phase delayed signals derived from said second oscillator, causing energy to be transferred from the secondary winding of said transformer to the primary winding of said transformer, allowing power to be converted from the load side to supply side of said power conversion system.

16. The power conversion system of claim 13 wherein said second switching matrix comprises a rectifying matrix for converting said alternating signal from said secondary winding to a direct current power output signal to said first and second output lines.

17. The power conversion system of claim 16 further including a high frequency filter network means electrically coupled to said output terminals for filtering noise produced across said first and second output lines.

18. The power conversion system of claim 13 wherein said output command signals are at frequency greater than 20 kilohertz.

19. The power conversion system of claim 11 wherein said first switching matrix includes at least two pairs of complementary switching elements connected to said input terminals and said first control circuit includes means to activate said switching elements when there is substantially zero volts across said elements.

20. The power conversion system of claim 11 wherein said second switching matrix includes at least two pairs of switching elements connected to first and second leads of said secondary of the transformer and having at least a first and second configuration, wherein said first configuration connects said first lead of said secondary of said transformer to said first output line while simultaneously connecting said second lead of said secondary of said transformer to said second output line, and wherein said second configuration electrically connects said second lead of said secondary of said transformer to said first output line while simultaneously connecting said first lead of said secondary of said transformer to said second output line.

21. The power conversion system of claim 12 wherein said first oscillator and said second oscillator produce drive command signals that are at different frequencies.

22. The power conversion system of claim 21 wherein said second switching matrix produces an alternating current power output signal coupled to said first and second output lines from said alternating signal from said secondary winding, said power output signal at a frequency that is a difference between the frequency of the first oscillator and the second oscillator command signals.

* * * * *